April 28, 1953 J. A. McNALLY 2,636,790
RESILIENTLY MOUNTED THRUST BEARING
Filed April 29, 1949 3 Sheets-Sheet 1
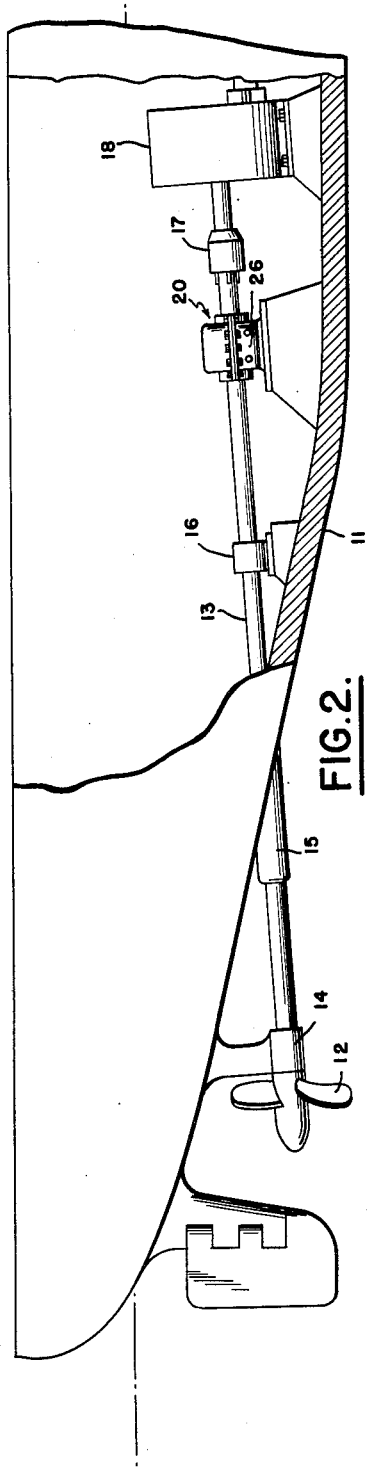
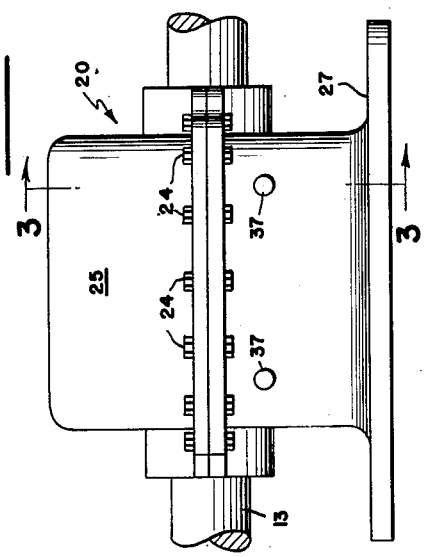
*INVENTOR.*
James A. McNally
BY
ATTORNEY

April 28, 1953  J. A. McNALLY  2,636,790
RESILIENTLY MOUNTED THRUST BEARING
Filed April 29, 1949  3 Sheets-Sheet 2

INVENTOR.
James A. McNally
BY
ATTORNEY

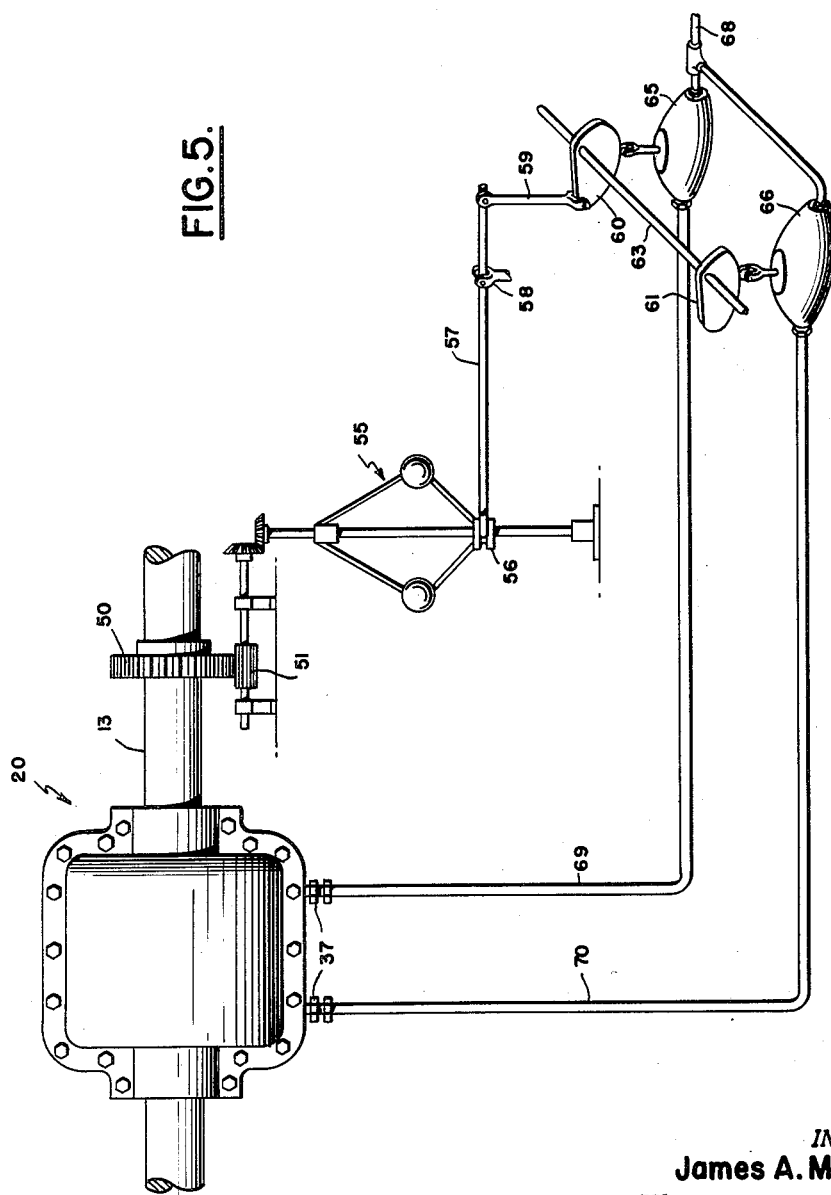

Patented Apr. 28, 1953

2,636,790

UNITED STATES PATENT OFFICE 2,636,790

RESILIENTLY MOUNTED THRUST BEARING

James A. McNally, United States Navy, Arlington, Va.

Application April 29, 1949, Serial No. 90,521

6 Claims. (Cl. 308—160)

(Granted under Title 35, U. S. Code (1952), sec. 266)

The present invention relates to resiliently mounted thrust bearings and more particularly to thrust bearings which employ pneumatic cushioning.

Presently available thrust bearings are adapted to rigidly fix the longitudinal position of a shaft so as to transmit any end thrust to the supporting structure, and any longitudinal vibration of the shaft is similarly transmitted through the bearing to the supporting structure. However, in many installations, the loading of the shaft results in longitudinal vibrations which, when transmitted through the thrust bearing to the device, cause highly undesirable vibrations. The blades of a ship's propeller pass through areas of disturbed water produced by the passage of the hull through the water which offer resistances to the blades which are different from that offered by undisturbed water and thereby cause torsional deflections in the shaft driving the propeller and result in severe longitudinal vibrations in the shaft because of the twisting and untwisting of the shaft.

The vibratory motion of the shaft will have a frequency which is directly proportional to the rotational speed of the propeller shaft and to the number of blades used in the propeller, and therefore changes in frequency as the speed of the vessel is changed. The variations in the thrust on the shaft will depend upon the disturbance of the water in which the propeller operates and changes with the speed of the vessel through the water.

Supporting structure must of course, be provided within the ship to absorb the thrust produced by the propeller and to hold the propeller shaft in proper alignment, and this structure is also subjected to vibration which is transmitted to the hull of the vessel as objectionable noise in the hull and which travels through the water over long distances. The amplitude of the vibration will depend upon the variation in torque of the shaft, the mass of the propeller and its shaft, and the resilience of the supporting structure for the propeller. However, if the natural frequency of the propeller system is equal to the vibration frequency of the shaft, the amplitude of the vibration is intensified, and if the resonant frequency of the propeller system is lower than the maximum vibration frequency, the system must be in resonance at some speed in the vessel's speed range. In order to prevent resonance in the propeller system, it has been necessary to provide very stiff supports for the propeller shaft and the thrust bearings, which supports transmitted vibration to the hull with very slight attenuation. However, it is becoming increasingly important that vessels be silenced to prevent detection, and it is therefore advantageous to adjust the resonant frequency of the propeller system during operation of the vessel to provide effective operation at any speed.

The present invention avoids the transmission of longitudinal vibration by providing pneumatic cushioning between the shaft and its supporting structure so as to isolate the shaft vibration. The proper isolation of vibration requires that the supporting system have a natural frequency below the vibration frequency produced by the shaft loading, the natural frequency of the shaft and its connected parts depending upon its mass and upon the stiffness of the support. It is, of course, difficult to adjust the mass of the parts and it has heretofore been difficult to vary the stiffness of the support, but the present invention allows the operator to change the natural vibration frequency over a considerable range by merely changing the pressure in the pneumatic cushioning.

An object of the present invention is to provide a thrust bearing which isolates the supporting structure from a shaft carrying longitudinal vibration.

A further object of the present invention is to provide a resilient thrust bearing in which the resistance of the bearing may be easily adjusted while the shaft is in operation.

Further objects and advantages of the present invention will be made more apparent by reference to the following description and to the appended drawings in which:

Fig. 1 is a showing of the thrust bearing of the present invention applied to a ship;

Fig. 2 is an elevation view of the thrust bearing of the present invention;

Fig. 5 is an automatic control system applied to the present invention.

Figure 3:
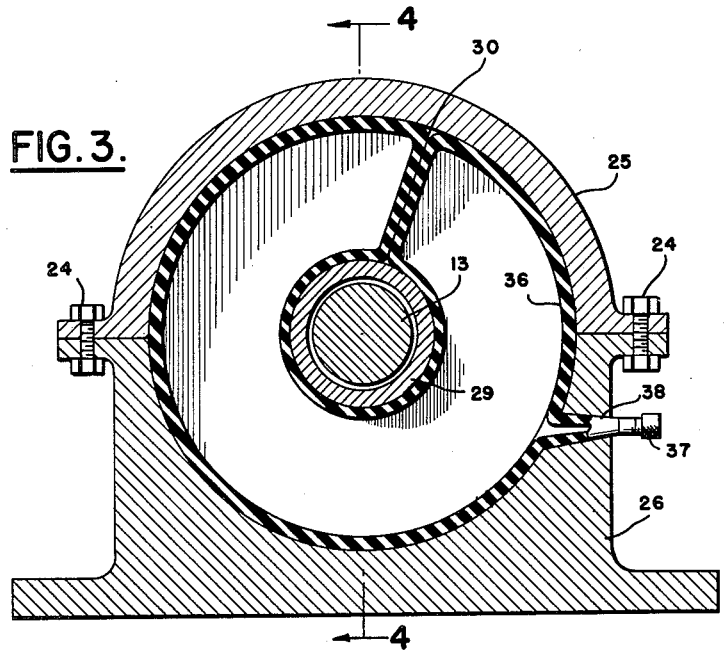
Fig. 3 is a section view taken on line 3—3 of Fig. 2.

Referring now to Fig. 1, the hull 11 is provided with a propeller 12 mounted on a propeller shaft 13 in the usual manner, the propeller shaft 13 being supported by the strut bearing 14 near its outer end and passing through the water seal bearing 15 and the guide bearing 16. The thrust bearing 20 is mounted on the foundation of the hull 11 so as to transmit the thrust produced by the propeller 12 and the propeller shaft is splined at its inner end to operatively engage the splined coupling 17 between the gear box 18 and the thrust bearing 20 to prevent transmission of the thrust to the gearing or the hull other than through the thrust bearing.

As illustrated in Fig. 2, the thrust bearing 20 is provided with a housing split horizontally into two complementary sections 25 and 26 secured together by any convenient means, such as the bolts 24. The lower section 26 is provided with a mounting base 27 adapted to be secured to a foundation and the housing is provided with bosses 28 which allow the shaft to pass into and out of the housing and may also serve as guide bearings for the shaft, if desired.

Figure 4:
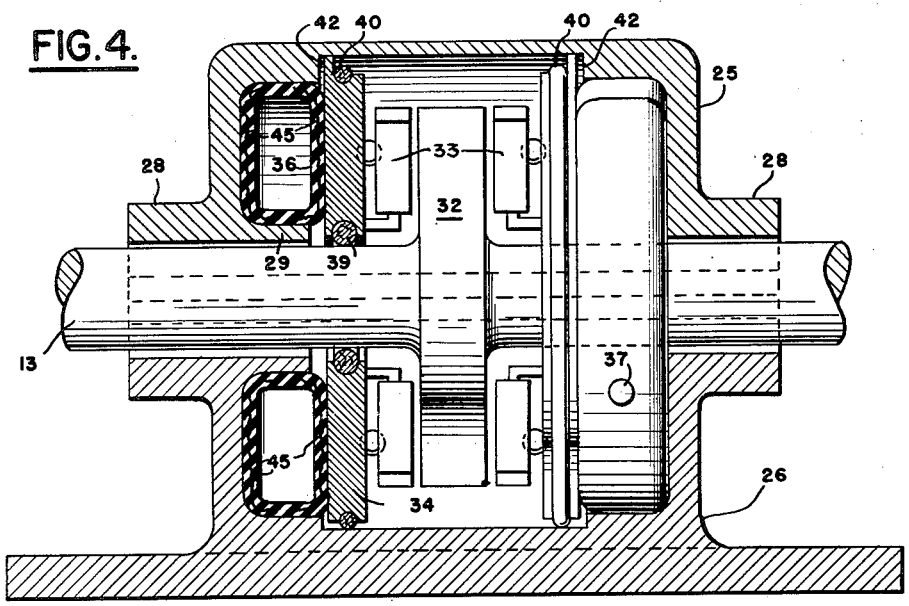
Fig. 4 is a section view taken on line 4—4 of Fig. 3.

As shown in Fig. 4, the shaft 13 passes through the bosses 28, 28 and the interior bosses 29 at either end of the housing. Each end of the housing is provided with a circular receptacle adapted to receive an envelope 36 made from an impervious resilient material such as natural or synthetic rubber. The receptacle is formed between the inner boss 29, the inside surface of the side wall of the housing, with the end of the housing providing the bottom thereof, so that one side of the receptacle is open.

The envelopes 36 are each provided with an inflating stem 37 which passes through the side wall of the lower housing section 26 by means of the holes 38, and may be equipped with a check valve and protecting cap of any desired type, such as is used in ordinary truck tires. The envelope 36 is molded to fit the receptacle in the housing 20 and may be split if it is desired to allow placing it around rather than slipping it over the end of the shaft and to facilitate assembly of the bearing.

The ends of the envelope 36 form a smooth junction 30 when the envelope 36 is placed within the receptacle. It will be apparent that the envelopes 36 may be in the form of a torus if it should be desired to so construct them. Re-enforcing means 45 may be molded into the envelope 36 to prevent the envelope from being forced into the spaces between the plate 34 and shoulder 42 and the plate 34 and the inner boss 29 if desired. Such re-enforcing means may consist of fabric or wire, and should be discontinuous to allow the envelope 36 to expand and contract as the thrust collar 32 changes position.

The method of transmitting the axial thrust of the rotating shaft 13 to a non-rotating member depends upon the particular installation for which the thrust bearing is intended. Ball and roller bearing of well-known types may be employed in applications requiring low friction and where lubrication is difficult, while pivoted segmental bearings may be employed in applications involving high axial thrusts. The latter type is illustrated in the present application, but it should be appreciated that other types of bearings may be employed without departing from the spirit of the present invention.

The shaft 13 may be provided with a collar 32 which has a diameter several times that of the shaft and has its plane surfaces ground perpendicular to the axis of the shaft. A plurality of tiltable shoes 33 bear against each side of the collar 32 and transmit the thrust to the pressure plates 34 through the tiltable attachment of the plate 34 and the shoes 33. The reverse sides of the pressure plates bear against the envelope 36 and the pressure is transmitted from the pressure plates 34 to the housing 20 through the envelope 36.

The pressure plates 34 are provided with oil seals to prevent oil leakage past the plate by means of the rubber sealing rings 39 and 40 which are slidably engaged with the wall of the housing 20 and the shaft 13. In addition, the pressure plates 34 are prevented from rotating by means of projecting tongues in longitudinal grooves in the housing 20.

The interior boss 29 and the shoulder 42 provide bearing surfaces which support the pressure plate 34 at its limit of travel so as to prevent damage to the envelope in the event of a severe overload and to allow operation of the bearing in case the envelope fails. The pressure plate 34 may be divided on a diameter parallel with the separation of the housing 20 to allow easy disassembly in the manner well-known to those skilled in the art.

In the operation of the thrust bearing, the inflatable envelopes 36 are individually inflated to pressures which maintain the collar 32 in a centered position relative to the housing 20. It will be appreciated that the pressures employed in the envelopes should be as low as is consistent with proper positioning so as to allow the maximum isolation of shaft vibration. Indicators of conventional design may be used to indicate the centered position of the bearing.

If it should be desired to do so, the resilience of the thrust bearing may be adjusted during the operation of the device. The operator may readily change the pressure in either or both bladders by means of an air line and a gauge in a manner similar to that in which automotive tires are inflated. The desired pressures may be determined either by experiment or by calculation.

Since the amplitude and frequency of the longitudinal vibrations of the shaft 13 change with its speed, it may be desirable in some cases to automatically adjust the pressures in the envelopes 36 for changes in speed. As diagrammatically shown in Fig. 5, the shaft 13 is equipped with a gear 50 mounted thereon and in driving engagement with the gear 51 which is made sufficiently long to allow the shaft 13 to move limited distances in an axial direction relative to the gear 51. The speed responsive device 55 is driven from the gear 51 and is arranged so that an increase in speed moves the collar 56 upward. The lever 57 is pivoted about the support 58 and is operatively connected with the collar 56 so as to assume a position dependent upon the speed of the shaft 13. The cams 60 and 61 are fixed to the shaft 63 and connected to the free end of the lever 57 by means of the rod 59 and are therefore angularly positioned in accordance with the speed of the shaft 13.

The cams 60 and 61 are arranged to control the regulated output pressure from the pressure regulators 65 and 66 by changing the adjustment of the associated regulator. The ouput side of each of the regulating valves is individually connected to one of the inflating stems 37 by means of the tubes 69 and 70, and the input sides of the pressure regulators 65 and 66 are connected to a source of air pressure represented by the tube 68.

The operation of the device shown in Fig. 5 is as follows: The speed of the shaft 13 controls the angular position of the cams 60 and 61, and the angular position of the cams 60 and 61 determines the regulated pressure applied to the envelopes 36 and hence the stiffness of the thrust bearing 20. The radius of the cams 60 and 61 for any angular position is determined to provide the desired resilience in the bearing.

It will be readily apparent that the automatic system illustrated may be modified by changing the type of speed responsive device 55 and its connection to the shaft 13. The linkage employed and the type of pressure regulators are also easily changed to suit a particular installation.

It will be apparent that the device herein described is capable of many changes and modifications by those skilled in the art without departing from the spirit of the present invention and that the present description is illustrative of only one modification.

The invention herein described may be manufactured and used by and for the Government of the United States of America without the payment of any royalties thereon or therefor.

What is claimed is:

1. In a resilient thrust bearing, a shaft, a circular collar having parallel plane sides mounted symmetrically on the shaft, a pair of non-rotating members having substantial movement in a direction parallel to the shaft, tiltable shoes attached to each of said members, said shoes adapted to transmit thrust between said members and said collar, a pair of resilient inflatable envelopes engaging the sides of said non-rotating members opposite said collar, a supporting structure having surfaces parallel to said collar and engaging the sides of said inflatable envelopes opposite said non-rotating members, and means to individually inflate said envelopes, whereby the resistance to axial movement of said shaft in opposite directions may be adjusted to minimize the transmission of longitudinal vibration.

2. In a resiliently mounted thrust bearing adapted to transmit an axial thrust from a rotating shaft to a housing, a circular collar having parallel plane sides symmetrically mounted on the shaft, a pair of anti-friction devices engaging opposite sides of said collar and having a pair of non-rotating surfaces opposite the surfaces engaging said collar, a pair of inflatable resilient envelopes molded in the form of a split torus and positioned to engage the non-rotating surfaces of said anti-friction devices, a housing having surfaces engaging the sides of said envelopes opposite said non-rotating surfaces, and means for individually inflating said envelopes, whereby the axial thrust of said shaft is transmitted to said housing through said inflatable envelopes and the longitudinal vibration is isolated by said envelopes from said housing.

3. In a resilient thrust bearing for transmitting an axial thrust, a shaft, a base member supporting said shaft, a collar secured to said shaft having symmetrical surfaces coaxial with said shaft, first and second thrust transmission devices engaging said collar on respective sides thereof, first and second gas-filled resilient envelopes encircling said shaft and having a diameter less than the diameter of said thrust transmission devices and engaging said first and second thrust transmission devices respectively, said base member having inwardly facing open-sided receptacles at respective ends thereof having a depth less than the thickness of said compressible envelopes and having a shoulder surrounding the open ends of each of said receptacles substantially parallel to said thrust transmission devices whereby said shaft vibrations are isolated from said base member under normal operation by said compressible envelopes and said envelopes are protected from excessive longitudinal movement of said collar by said receptacles and said shoulders.

4. In a resilient thrust bearing adapted to transmit an axial thrust, a base member, a rotating shaft supported on said base member, a symmetrical collar secured to said shaft, first thrust transmission means, a first tiltable shoe attached to said first means, said shoe adapted to transmit a first thrust from said collar to said first means, a first compressible inflated envelope engaging said first means and said base member to produce a yieldable restraining force on said collar opposing axial movement thereof in the direction of said first thrust, second thrust transmission means, a second tiltable shoe attached to said second means, said second shoe adapted to transmit thrust from said collar to said second means, a second compressible inflated envelope engaging said second means and said base member to produce a yieldable restraining force on said collar opposing axial movement thereof in the direction of said second thrust, whereby longitudinal vibrations are effectively cushioned by said compressible envelopes.

5. In a resilient thrust bearing adapted to transmit axial thrust, a rotating shaft, a mounting for said shaft, a collar attached to said shaft, a pair of thrust transmission members coaxial with said collar and disposed on opposite sides of said collar, tiltable shoes attached to each of said members for transmitting thrust between said collar and said members, a pair of inflatable resilient envelopes engaging said members respectively on the sides thereof away from said collar, said mounting engaging said inflatable envelopes, means for inflating said envelopes, said means comprising a speed responsive control device connected to said shaft, fluid pressure regulating means, conduit means connecting one end of said pressure regulating means to a source of fluid supply and the other end to said envelopes, and a connector connecting said control device with said pressure regulating means, whereby the amount of fluid directed to said envelopes is regulated according to the speed of said shaft.

6. In a resilient thrust bearing adapted to transmit a fluctuating axial thrust from a rotating shaft to a foundation, a collar having symmetrical sides attached to said shaft, a pair of non-rotating members coaxial with said collar and disposed on opposite sides of said collar, tiltable shoes attached to each of said members for transmitting thrust between said collar and said members, a pair of inflated resilient envelopes respectively engaging said non-rotating members on the side thereof away from said collar, a supporting structure adapted for attachment to said foundation engaging said inflated envelopes, and said envelopes being individually inflated with a compressible gas, whereby the axial thrust of said shaft is transmitted to said foundation through the resilience of said inflated envelopes.

JAMES A. McNALLY.

References Cited in the file of this patent

UNITED STATES PATENTS

| Number | Name | Date |
| --- | --- | --- |
| 1,325,459 | Wingfield | Dec. 16, 1919 |
| 1,421,208 | Gauldie | June 27, 1922 |
| 1,425,979 | Kingsbury | Aug. 15, 1922 |
| 2,440,919 | Shaw | May 4, 1948 |

FOREIGN PATENTS

| Number | Country | Date |
| --- | --- | --- |
| 8,830 | Netherlands | Apr. 16, 1923 |
| 240,960 | Germany | Nov. 21, 1911 |
| 373,078 | Germany | Apr. 7, 1923 |